(12) United States Patent
Atezhev et al.

(10) Patent No.: US 8,345,723 B2
(45) Date of Patent: Jan. 1, 2013

(54) GAS LASER

(75) Inventors: Vladimir Vasilyevich Atezhev, Troitsk (RU); Sergei Karenovich Vartapetov, Troitsk (RU); Alexandr Vjacheslavovich Filippov, Troitsk (RU)

(73) Assignee: Optosystems Ltd. PIC GPI RAS, Troitsk, Mosow Region (RU)

( * ) Notice: Subject to any disclaimer, the term of this patent is extended or adjusted under 35 U.S.C. 154(b) by 0 days.

(21) Appl. No.: 13/138,890

(22) PCT Filed: May 27, 2010

(86) PCT No.: PCT/RU2010/000273
§ 371 (c)(1),
(2), (4) Date: Oct. 18, 2011

(87) PCT Pub. No.: WO2010/147501
PCT Pub. Date: Dec. 23, 2010

(65) Prior Publication Data
US 2012/0087387 A1    Apr. 12, 2012

(30) Foreign Application Priority Data
Jun. 19, 2009 (RU) .................... 2009123269

(51) Int. Cl.
*H01S 3/22* (2006.01)

(52) U.S. Cl. .............................................. 372/58; 372/63
(58) Field of Classification Search .................... 372/58, 372/63
See application file for complete search history.

(56) References Cited

U.S. PATENT DOCUMENTS

| | | | |
|---|---|---|---|
| 5,033,056 A * | 7/1991 | Perzl ................................ | 372/58 |
| 2002/0044587 A1 | 4/2002 | Oliver et al. | |
| 2004/0131100 A1* | 7/2004 | Bragin et al. .................... | 372/55 |
| 2009/0129423 A1* | 5/2009 | Wilson ............................. | 372/58 |

FOREIGN PATENT DOCUMENTS

| | | |
|---|---|---|
| JP | 3664030 | 9/2001 |
| RU | 2132104 | 6/1999 |
| RU | 2334325 | 9/2008 |

* cited by examiner

*Primary Examiner* — Tod T Van Roy
(74) *Attorney, Agent, or Firm* — Aleksandr Smushkovich

(57) ABSTRACT

A TE gas laser contains a gas contour with the following elements arranged in succession: a discharge gap formed by two elongated electrodes; a diffuser; a heat exchanger; a cross-flow fan; and an additional converging channel, the inlet opening of which is situated on the discharge side of the fan, while the outlet opening is oriented towards the fan impeller on the intake side of the fan. The proposed technical solution makes it possible to produce a compact TE gas laser with a high pulse repetition rate.

4 Claims, 1 Drawing Sheet

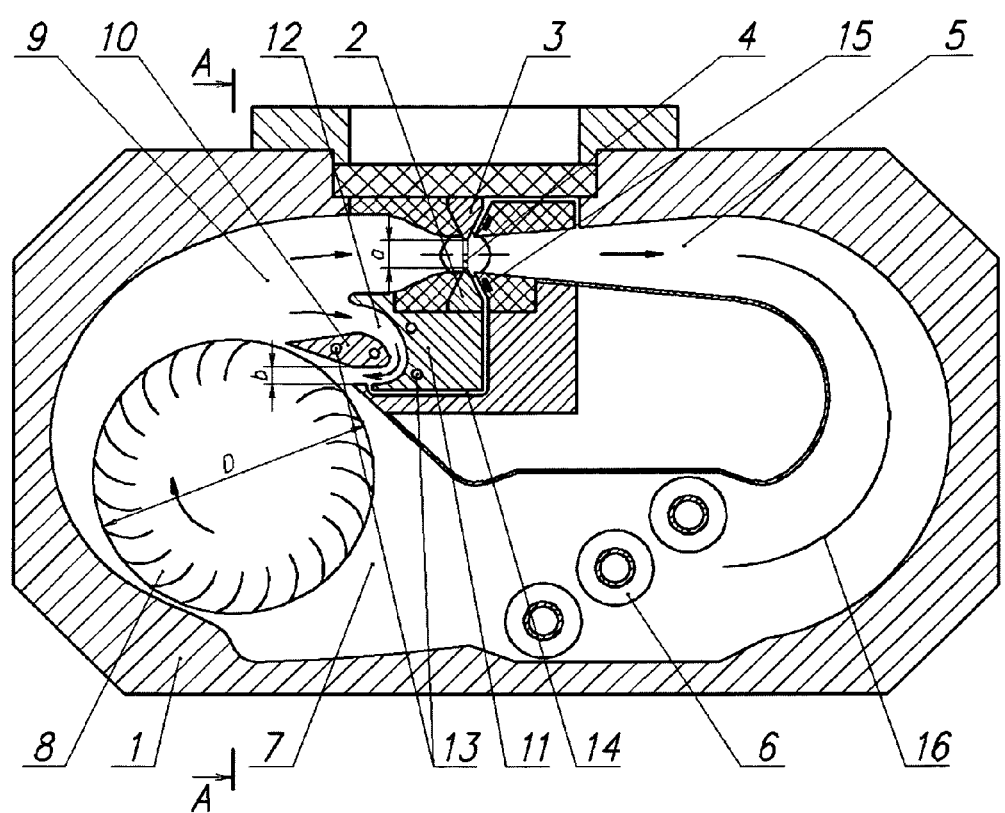

GAS LASER

CROSS-REFERENCE TO RELATED APPLICATIONS

This application is a U.S. national stage application of a PCT application PCT/RU2010/000273 filed on 27 May 2010, published as WO/2010/147501, whose disclosure is incorporated herein in its entirety by reference, which PCT application claims priority of a Russian Federation application RU2009123269 filed on 19 Jun. 2009.

FIELD OF THE INVENTION

The present invention is related to the field of quantum electronics, particularly, to gas-discharge TE (transversally electric) lasers with high repetition rate, such as excimer, nitrogen, $CO_2$- lasers, etc..

BACKGROUND OF THE INVENTION

There is known a gas laser, described in a Russian federation patent RU2334325. An additional gas channel is arranged in this laser for increasing a laser pulse repetition rate. However such channel does not allow for accelerating a flow of gas in a discharge zone of laser, and therefore to increase the repetition rate of laser pulses.

Another gas laser with a high repetition rate of pulses is described in a patent RU2132104. This laser has a small gap between main discharge electrodes relative to a diameter of a fan. This laser has also an additional channel. An entrance aperture of the additional channel is located in an outlet zone of the fan. A part of a gas flow is passed through this channel that promotes increasing in the pulse repetition rate. However such solution has a low efficiency.

DESCRIPTION OF THE INVENTION

The primary goal of this invention is the creation of a compact gas laser with a high repetition rate of laser pulses.

The aforementioned goal is achieved by providing the inventive TE gas laser comprising: a gas contour for providing a gas flow in the laser, wherein the gas flow has a predetermined direction, and the gas contour includes the following sequentially disposed elements: —a discharge gap formed between two elongated electrodes, providing an electrical discharge of the laser, wherein the gap has a certain size, the gap is disposed substantially transversely to the direction of the gas flow, and the gap is characterized by an electric discharge zone associated therewith, wherein the electric discharge zone has an exit portion wherefrom the gas flow escapes from the discharge zone; —a diffuser; a heat exchanger; a cross-flow fan with an impeller having a predetermined external diameter, wherein the fan has a discharge side for pumping the gas flow, and an intake side for suction of the gas flow; an additional tapering channel (herein further called an 'additional channel' for short) formed as a curved (looped) confuser, having an inlet opening located at the discharge side of the fan, and an outlet opening located at the intake side of the fan, wherein the inlet opening is greater than the outlet opening, and the size of the gap ranges from 0.05 to 0.25 of the external diameter of the impeller.

A high repetition rate of laser pulses is provided by a high velocity and uniformity of the gas flow in the discharge gap. One can increase the velocity of gas flow in the discharge gap by raising a frequency of rotation of the impeller, or by increasing the impeller's diameter.

However, when the rotation frequency of the impeller raises, a negative influence of acoustic waves and vibrations on the character of the electrical pumping discharge and, accordingly, on the quality of laser radiation increases essentially. A substantial growth of the impeller diameter in relation to the distance between the electrodes (the size of the gap) causes the fan to work beyond an optimal operating mode, and that does not lead to a growth of the gas flow's velocity (<<Quantum electronics>> Vol. 30, No (2000), p. 783-786, <<Design of powerful KrF lasers with pulse repetition rate up to 5 kGz>>).

The curved (looped) additional channel in the confuser (converging or tapering) form, directed to the fan impeller, allows for increasing an overall performance of the fan and the velocity of the gas flow even with a relatively small distance between the electrodes, which ranges from 0.05 to 0.25 of the external diameter of the impeller. Since the channel is made as a curved (looped) confuser, the outlet opening of channel is connected to the intake side of the fan, the inlet opening of channel is connected to the discharge side of the fan, a portion of the gas flow from the discharge side returns to the closely located zone of the intake side with a relatively high velocity and small losses of pressure, thereby creating a recirculated gas flow.

A part of energy from the recirculated gas flow of the additional channel is passed to the basic gas flow, which passes through the discharge gap. That promotes accelerating the basic flow through the discharge gap. Besides, the optimally formed additional channel takes away those particles, which have velocities directed at an angle to the basic gas flow, and directed along the direction of the inlet part of the additional channel. The particles, which have velocities directed towards the discharge gap, participate in formation of the basic flow that enhances uniformity of the basic flow in the electric discharge zone. Acceleration of the gas flow by energies of particles of the additional channel flow and a high uniformity of the basic gas flow in the electric discharge zone allow for increasing the pulse repetition rate, stability, and an overall performance of the system. The additional channel, which is directed towards the fan impeller, allows for accelerating the gas flow through the main discharge gap without increasing the diameter of the fan impeller. In turn, this allows for increasing the pulse repetition rate without increasing the dimensions of the gas laser.

For the best mode of the present invention, a sum of the distance between the main electrodes (i.e. the size of the discharge gap) and a height of the outlet opening of the additional channel should range from 0.1 to 0.4 of the external diameter of impeller. The experiments conducted by the instant inventors have shown that the above size relation has been optimal. The size relation allows for attaining a maximum velocity of the gas flow in the discharge gap.

In a preferred embodiment, the additional channel is made with cooling. A whirlwind, formed in the impeller zone during operation of any cross-flow fan, has a relatively low heat exchange with the basic flow. This leads to the appearance of a temperature gradient in gas flow through the discharge gap. In a high pulse repetition rate mode, an electrode located in a zone of the gas flow near the whirlwind, is heated up to a higher temperature and, hence, this electrode is subject to a more intense erosion. The additional channel with cooling facilitates equalizing the temperature of the gas flow in the gap between the electrodes. This raises the quality of radiation and slows down the rate of erosion of the respective electrode. It positively affects stability of the laser operation.

The additional cooling can be provided, for example, in the form of a number of cooling channels arranged in the walls of the additional channel.

In a preferred embodiment, a clearing gas channel is provided, which connects the exit portion of the electric discharge zone and the narrower outlet portion of the additional channel. Typically, the shape of electrodes is optimized for creation of the homogeneous electric discharge, but this causes a high gas flow resistance. A stagnant zone may appear at the gas outlet exit portion of the electric discharge zone. The clearing channel, connecting the exit portion of the electric discharge zone and the outlet narrower portion of the additional channel, helps removing the discharge products from the stagnant zone and thereby avoiding a parasitic electric breakdown. A velocity of the gas flow in the narrow outlet portion of the additional channel is essentially greater than a velocity of the gas flow in the stagnant zone, which causes an 'ejector' effect that promotes an outflow of the gas y containing the discharge products from the stagnant zone. It raises dielectric resistance of the gas exit portion of the electric discharge zone, which, in turn, promotes increasing the pulse repetition rate and positively influences the stability of the laser operation.

The inventive design results in the a creation of a compact TE gas laser with an effective gas circulation, stable operation, and high repetition rate of pulses.

BRIEF DESCRIPTION OF DRAWING OF THE INVENTION

FIGURE is a cross-sectional view of the laser chamber of the laser, according to a preferred embodiment of the present invention.

PREFERRED EMBODIMENTS OF THE INVENTION

While the invention may be susceptible to embodiment in different forms, there is shown in the drawing, and will be described in detail herein, a specific embodiments of the present invention, with the understanding that the present disclosure is to be considered an exemplification of the principles of the invention, and is not intended to limit the invention to that as illustrated and described herein.

In FIGURE there is shown the inventive laser, comprising a hermetic gas chamber 1, which includes a gas circulation contour for passing a gas flow, wherein the contour comprises the following elements arranged in a sequential order: main electrodes 2 and 3 arranged transversely to the gas flow; a main discharge gap 4 formed between the electrodes 2 and 3, wherein the discharge gap is characterized by a predetermined electric discharge zone proximate to the gap, which electric discharge zone includes an entrance portion and an exit portion; a diffuser 5 adjacent to the exit portion of the discharge zone, a radiator 6; a fan including an impeller 8; an inlet zone 7 (an intake side) of the fan, the inlet zone 7 is located between the radiator 6 and the impeller 8; an outlet zone 9 (a discharge side) of the fan, the outlet zone 9 is located between the impeller 8 and the discharge gap 4. Elements 10 and 11 form an additional looped tapered channel 12 (that is also called a 'confuser' channel or a 'conversing' channel), having a wider portion with an inlet opening and a narrower portion with an outlet opening, wherein the channel 12 is bent in such a manner that the inlet opening is connected to the outlet zone 9, and the outlet opening is connected in the inlet zone 7. Cooling channels 13 are formed within the elements 10 and 11. The exit portion of the discharge zone is connected to the narrower portion of the channel 12 by a clearing channel 14. The clearing channel 14 covers a working surface of a pre-ionizer 15. A curved gas flow guide 16 is mounted in the place of a flow turn, i.e. between the diffuser 5 and radiator 6. There are windows for output of the laser radiation (not shown). The main discharge electrodes 2 and 3 are connected to a power supply (not shown).

The following geometrical relations are utilized in the design of the preferred embodiment. A distance between the electrodes 2 and 3 'a' and an external diameter 'D' of the fan impeller 8 are related by the ratio of: a=(0.05-0.25)*D. A sum of the distance between the electrodes 'a' and a height 'b' of the narrowing portion of the additional channel, and the external diameter 'D' are related by the ratio of: (a+b)=(0.1−0.4)*D.

The laser illustrated in FIGURE operates as follows. A high-voltage high-current pulse is applied between the main electrodes 2 and 3. This produces an electric volume pumping gas discharge in the discharge gap 4, which leads to a laser generation. For operating in the high repetition rate mode, the products of the electric discharge are removed from the discharge gap 4 by the gas flow created by the fan impeller 8 in the gas contour.

The fan impeller 8 rotates and creates the gas flow passing through the discharge gap 4. As indicated above, the distance between the main electrodes 2 and 3 (or the size of discharge gap 4) ranges from 0.05 to 0.25 of the external diameter 'D'. The gas contour with such considerable differences of passage cross-sections requires relatively high discharge pressures from the fan. The additional channel 12 causes the return of a part of the gas flow (recirculated flow) with relatively small losses and high energy back to the fan impeller 8 that increases a velocity of the basic gas flow being in contact with the recirculated flow, thereby increasing the velocity of the gas flow in the discharge gap 4.

As mentioned above, the height 'b' of the narrowing portion of the additional channel, the distance between the electrodes 'a', and the external diameter 'D' of the fan impeller are tied by the ratio of: a+b=(0.1÷0.4)*D. The specified range contemplates the most efficient engineering solution provided by the present invention. For example, the experimental model of laser with the distance between electrodes of 14 mm, the height of narrowing portion of the additional channel of 6.5 mm, and the external diameter of the fan impeller of 110 mm provided the speed of the gas flow in the discharge gap 2.9 times greater than the speed of the external diameter of the fan impeller. In the same conditions, but without the additional channel, the speed of the gas flow in the discharge gap was greater than the speed of the external diameter of the fan impeller in 2.2 times only. This allows for a significant reduction of the laser size, i.e. the creation of a compact and efficient gas laser.

When the cooling channels 13 are employed, the uniformity of temperature in the gas flow throughout the discharge gap is enhanced, which, in turn, improves the stability of laser operation. This also positively affects the radiation quality and service life of the electrode 2.

Slowly relaxing gas discharge products, concentrated in the zone of electrode 2 and pre-ionizer 15, are pumped out through the clearing channel 14. This excludes a parasitic high-voltage breakdown in the aforesaid zone.

Industrial Applicability

The proposed invention can be utilized for designing compact gas lasers with a high pulse repetition rate, such as excimer lasers. On the other hand, such gas lasers may have various useful applications in different technological processes.

The invention claimed is:

1. A transverse electric (TE) gas laser comprising:
a gas contour for providing a gas flow in the laser, said gas flow having a predetermined direction, said gas contour includes the following elements:
- a discharge gap formed between two elongated electrodes, providing an electrical discharge of the laser, said discharge gap is located substantially transversely to the direction of the gas flow, wherein said discharge gap has a size;
- a cross-flow fan with an impeller having a predetermined external diameter, wherein the fan has a discharge side for pumping said gas flow and an intake side for suction of said gas flow; and
- an additional channel formed as a curved confuser. having an inlet opening located at said discharge side and an outlet opening located at said intake side, wherein said additional channel tapers from said inlet opening to said outlet opening, and a portion of said gas flow from the discharge side returns to the intake side, thereby creating a recirculated gas flow; and
  wherein the size of said discharge gap ranges from 0.05 to 0.25 of the external diameter of said impeller;
  wherein a sum of the size of said discharge gap and a height of said outlet opening ranges from 0.1 to 0.4 of the external diameter of said impeller.

2. The gas laser of claim 1, wherein the additional channel is supplied with means for cooling.

3. The gas laser of claim 1, wherein said discharge gap is characterized with an electric discharge zone having an exit portion, and the gas laser further comprises a clearing channel connecting said exit portion with said outlet opening.

4. The gas laser of claim 2, wherein said discharge gap is characterized with an electric discharge zone having an exit portion, and the gas laser further comprises a clearing channel connecting said exit portion with said outlet opening.

* * * * *